United States Patent [19]

Buckl

[11] Patent Number: 4,508,838

[45] Date of Patent: Apr. 2, 1985

[54] COMPOSITIONS CONTAINING THIOLATES FOR REMOVAL OF HEAVY METAL IONS FROM DILUTE AQUEOUS SOLUTIONS

[75] Inventor: Hans Buckl, Freising, Fed. Rep. of Germany

[73] Assignee: Süd Chemie Aktiengesellschaft, Munich, Fed. Rep. of Germany

[21] Appl. No.: 524,786

[22] Filed: Aug. 19, 1983

[30] Foreign Application Priority Data

Aug. 27, 1982 [DE] Fed. Rep. of Germany ....... 3231982

[51] Int. Cl.$^3$ .......................... B01J 20/12; B01J 20/18
[52] U.S. Cl. ........................................ 502/62; 210/688
[58] Field of Search .................... 502/62, 168; 210/688

[56] References Cited

U.S. PATENT DOCUMENTS

| | | | |
|---|---|---|---|
| 3,033,641 | 5/1962 | Thomas, Jr. .................... | 210/688 X |
| 4,033,767 | 7/1977 | Colegate et al. ................ | 502/62 X |
| 4,100,065 | 7/1978 | Etzel ............................. | 210/688 X |
| 4,167,481 | 9/1979 | Cremers et al. ................ | 210/688 X |

FOREIGN PATENT DOCUMENTS 2263047  7/1973  Fed. Rep. of Germany ...... 210/688

OTHER PUBLICATIONS

Applied Clay Mineralogy by Grim, McGraw-Hill Book Co., Inc., N.Y., 1962, pp. 38 and 39.

Primary Examiner—Carl F. Dees
Attorney, Agent, or Firm—Wm. R. Price

[57] ABSTRACT

A composition containing thiolate for the removal of heavy metal ions from dilute aqueous solutions, characterized in that the composition is a sorption complex of a thiolate with two or more -SMe- groups (wherein Me represents alkali or ammonium) with a swellable silicate, whose ion exchange capacity is 5–350 milliequivalents/100 g. The composition is suspended in the aqueous medium to be purified and separated off after the absorption of the heavy metal ions from the aqueous solution. The heavy metals can be recovered in known ways.

13 Claims, No Drawings

COMPOSITIONS CONTAINING THIOLATES FOR REMOVAL OF HEAVY METAL IONS FROM DILUTE AQUEOUS SOLUTIONS

FIELD OF THE INVENTION

The invention concerns a composition containing thiolate for the removal of heavy metal ions from dilute aqueous solutions.

BACKGROUND OF THE INVENTION

A known thiol salt that makes possible the removal of heavy metal ions from dilute aqueous solutions is the sodium salt of trimercaptotriazine. This compound is usually added to an aqueous solution containing heavy metal ions as a 15% aqueous solution, i.e., in a slight stoichiometric excess, in order to precipitate the heavy metal ions as quantitatively as possible. The precipitate comes down in flakes and can be filtered.

Known precipitating agents based on thiolates always require a slight stoichiometric excess of the thiolate equivalents over the heavy metal equivalents, so that the thiolate excess remains in solution. Thus, when the thiolate is used for the removal of heavy metal ions from waste waters, the thiolate becomes the contaminant.

Swellable silicates with a certain ion exchange capacity, e.g., alkali bentonite, are also used for removal of heavy metal ions from aqueous solutions. (Compare, for example, TIZ Fachberichte, Vol. 106, No. 1 (1982), pages 137-139.) In this case the exchangeable alkali ions are exchanged with the heavy metal ions on the interface sites. Heavy metal ions are also adsorbed.

The binding capacity of the swellable silicates for heavy metal ions, however, leaves something to be desired. Thus, it is necessary, especially with waste waters laden with heavy metals, to use larger quantities (e.g., 5 g/liter) of alkali bentonites in order to arrive at lower heavy metal concentrations (e.g., <1 mg/liter). The amount of slurry precipitating with the filtration is thereby considerable and leads to familiar difficulties, both with the filtration and with the disposal of the metal contaminated sludge.

SUMMARY OF THE INVENTION

It was found, surprisingly, that, by the addition of small amounts of certain thiolates to the swellable silicates, a composition is obtained whose binding capacity for heavy metal ions is much greater than the sum of the binding capacities of the individual components. The subject of the invention is, therefore, a composition, in the form of a sorption complex, which contains thiolate, for the removal of heavy metal ions from dilute aqueous solutions, characterized in that a sorption complex of a thiolate with two or more —SMe— groups (wherein Me represents alkali or ammonium) is used with a swellable silicate, whose ion exchange capacity is 5-350 meq*/liter.

*meq=milliequivalents

DESCRIPTION OF THE PREFERRED EMBODIMENT

The structure of this sorption complex is not exactly known. It is possible that a pure adsorption or a chemisorption of the thiolate takes place on the positively charged lattice sites of the silicate. The binding capacity of the sorption complex for heavy metal ions is surprisingly high. For example, if 1.8 meq of a thiolate is added to a silicate with a specific binding capacity for heavy metals of 100 meq/100 g, the specific binding capacity of the resulting sorption complex increases, not by 1.8%, as would be expected, but rather by 6-32%, as is clearly shown in the following experimental results.

The thiolates used according to the invention can, for example, be the alkali or ammonium salts of aliphatic dithiols or polythiols. Further, the salts of aromatic dithiols or polythiols, for example, of thiohydroquinone, can be used. Especially preferred, however, are such thiolates as are derived from heterocyclic di- or trithiols. Examples of these compounds are 2,5-dimercapto-1,3,4-thiadiazol or trimercaptotriazine. The thiolate of the latter compound is preferably used, since the silicate sorption complex obtained thereby forms an easily filtrable precipitate with heavy metal ions.

The weight ratio between the silicate and the thiolate can fluctuate within wide ranges. In general, it lies between 100:1 and 5000:1, preferably between 100:1 and 1000:1.

The sorption complex used according to the invention can, in general, be produced by spraying the swellable silicate with an aqueous solution of the thiolate. Further, the thiolate can be added to an aqueous suspension of the swellable silicate. Furthermore, the swellable silicate can be combined with the thiol or a solution of the thiol, after which an alkali reacting composition is added. The alkali reacting composition (for example, NaOH or $Na_2CO_3$) can also be present in the silicate suspension.

The sorption complex, in an aqueous medium, preferably has a pH value of about 9.5-12. The pH value is determined with the help of a standard suspension containing 1 g of sorption complex in 100 ml of $H_2O$. The determination takes place at room temperature.

The silicate used according to the invention is swellable in aqueous solution, but is practically insoluble. Preferably, a smectitic, a kaolinitic, or a zeolitic clay mineral, or a mixture of the clay minerals, is used as the silicate. It is a prerequisite that these minerals have an ion exchange capacity (i.e.c.) of at least 5 meq/100 g.

Examples of kaolinite clay minerals are nacrite, dickite, and kaolinite. Examples of zeolite clay minerals are faujasite, mordenite, and chabazite. Synthetically produced zeolite clay minerals of the A- and Y-type can also be used, as they are described, for example, in "Zeolites and Clay Minerals as Sorbents and Molecular Sieves" by R. M. Barrer (1978), Academic Press, London.

The preferred clay minerals, however, are the minerals of the montmorillonite-beidellite series, to which belong montmorillonite (the chief mineral of bentonites), hectorite, beidellite, saponite, and nontronite. (Compare Ullmann's Enzyklopädie der technischen Chemie, Vol. 17, 1966, pgs. 593-594.)

Of the bentonites, the alkali bentonites are preferred, since these have a better binding capacity for heavy metal ions in comparison to alkaline earth bentonites. The natural alkali bentonites, as well as the alkali bentonites produced artificially from alkaline earth bentonites by conversion with alkalis, can be used.

The subject of the invention involves further a process for the removal of heavy metal ions from dilute aqueous solutions. This process is characterized in that the above mentioned composition or sorption complex is suspended in an aqueous medium containing heavy metal ions and separated off after the adsorption of the heavy metals from the aqueous solution.

The process according to the invention is suitable for the removal of heavy metal ions from very dilute solutions, which can be processed only uneconomically by other processes. After the separation of the sorption complex, laden with the heavy metal ions, the aqueous solution still contains heavy metal ions only in very small, harmless quantities. Also, the thiolates, which were used in the preparation of the sorption complex, leave no trace in the solution. The silicate also, therefore, acts as a sorption means for the thiolates, to a certain extent.

In general, an aqueous solution with a heavy metal concentration of about $5 \times 10^{-3}$ to $3 \times 10^{-1}$ meq/liter (0.5–50 mg/liter) is used and the substance according to the invention is added in a quantity of about 0.1–1 g per liter aqueous solution. These quantities correspond to only about $1.8 \times 10^{-3}$ to $1.8 \times 10^{-2}$ meq thiolate, i.e., the quantity of thiolate lies far below the required stoichiometric amount for binding with the heavy metal ions which are present.

With the help of the process according to the invention, aqueous solutions containing ions of the heavy metals Cu, Ag, Au, Zn, Cd, Hg, Tl, Sn, Pb, As, Sb, Bi, Cr, Mo, W, Mn, Co, Ni, and/or metals of the actinide series can be treated.

The process according to the invention can be carried out in a simple manner. It suffices to stir the sorption complex into the aqueous solution to be purified, to allow the suspension to stand for a time, and thereafter to separate the sorption complex, laden with the heavy metal ions, by filtration or by decanting the treated water after the complex has settled out. The temperature does not change during treatment. The only exception occurs when the aqueous solution is acidic. When the solution is acidic, it is either first neutralized or mixed with a sorption complex enriched with alkali. In general, the pH value of the aqueous solution containing the sorption complex is adjusted to about 7–10.

The process according to this invention is especially suited for cleaning waste waters containing heavy metal ions, e.g., community and industrial waste waters. Acidic waste waters, which must be neutralized, accumulate, for example, in metal pickling plants. According to this invention, the waste waters of electroplating industries, tanneries and dye works, as well as the waste waters of heavy metal smelting operations, can be processed.

The precipitation of the sorption complex laden with heavy metal ions can be accelerated by the addition of inorganic and organic flocculation agents, such as aluminum sulfate, polyacrylic acid, or polyacrylic amide. In this way, an easily filtrable precipitate is obtained.

If it is desirable to recover the heavy metals, the process is, in general, to separate off the sorption complex from the aqueous solution as a precipitate, laden with the heavy metal ions, to treat it with acids for the solubilization of the heavy metal ions, and to recover the heavy metal ions from the acidic solution in a known way.

If it is a matter of, for example, rare metal ions (e.g., silver and gold ions), these can be recovered through cementation or through electrolysis. Copper, mercury, nickel, and cobalt, for example, can also be recovered through electrolysis. These and other heavy metals, however, can also be precipitated as hydroxides, carbonates, or sulfides. Specific precipitation methods can also be used for each element, for example, a precipitation with sulfate for lead and a precipitation with chloride for silver.

The process according to the invention therefore also makes possible a recovery of heavy metals from solutions with very low heavy metal ion concentrations, from which the heavy metals can only be recovered at a great expense by other processes.

The invention is illustrated through the following examples:

EXAMPLE 1

100 mg alkali bentonite, treated with 0.018 meq/g trimercapto-S-triazine (TMT), and, in comparison thereto, 100 mg untreated alkali bentonite, were stirred into 1 liter water with 10 mg/liter heavy metal for 10 minutes. The solution had a pH value of 8.

After filtering the slurry containing the heavy metals, the concentrations of the heavy metals recovered were measured and reported in Table I.

TABLE I

|  | Alkali bentonite (100 mg/liter) Specific heavy metal binding capacity | | Alkali bentonite with 0.018 meq TMT Specific heavy metal binding capacity | | Pro rata binding with 0.018 meq TMT | Increase in the heavy metal binding capacity | |
|---|---|---|---|---|---|---|---|
|  | mg/g | meq/g | mg/g | meq/g | mg | (a) through the complex % | (b) through TMT % |
| $Cd^{+2}$ | 61 | 1.08 | 73 | 1.30 | 1.01 | 19.7 | 0.6 |
| $Zn^{+2}$ | 58 | 1.77 | 75 | 2.29 | 0.50 | 29.3 | 0.9 |
| $Cu^{+2}$ | 93 | 2.92 | 98 | 3.08 | 0.57 | 5.4 | 0.5 |
| $Pb^{+2}$ | 85 | 0.82 | 90 | 0.87 | 1.80 | 5.9 | 2.2 |
| $Ni^{+2}$ | 38 | 1.30 | 50 | 1.71 | 0.52 | 31.6 | 1.4 |
| $Hg^{+2}$ | 54 | 0.54 | 71 | 0.71 | 1.80 | 31.5 | 3.3 |
| $Cr^{+3}$ | 84 | 4.85 | 90 | 5.20 | 0.31 | 7.1 | 0.4 |

EXAMPLE 2

In the same way as Example 1, the water containing 10 mg/liter heavy metal was treated with 100 mg/liter alkali bentonite, treated with 0.044 meq 2,5-dimercapto-1,3,4-thiadiazolate (bismuthiol I). The pH value was 8. The results are presented in Table II.

TABLE II

|  | Alkali bentonite Specific binding capacity | | Alkali bentonite with 0.044 meq bismuthiol I Specific binding capacity | | Pro rata binding capacity with 0.044 meq bismuthiold | Increase of the heavy metal binding capacity | |
|---|---|---|---|---|---|---|---|
|  | mg/g | meq/g | mg/g | meq/g | mg | (a) with the complex % | (b) with bismuthiold % |
| $Cd^{+2}$ | 61 | 1.08 | 75 | 1.33 | 2.44 | 23.0 | 4.0 |
| $Ni^{+2}$ | 38 | 1.30 | 49 | 1.67 | 1.29 | 28.9 | 3.4 |
| $Hg^{+2}$ | 54 | 0.54 | 68 | 0.67 | 4.41 | 24.0 | 4.4 |

EXAMPLE 3

Following the procedure of Example 1, water containing 10 mg/liter heavy metal was treated with 100 g synthetic Y-zeolite, treated with 0.0018 meq trimercapto-S-triazine (TMT). The pH value was 8. The synthetic Y-zeolite was produced through the conversion of sodium aluminate with sodium silicate and had a pore radius of 8 Å, a specific surface area of 500 m²/g, and an ion exchange capacity of 310 meq/100 g. The results are presented in Table III.

TABLE III

|  | Alkali bentonite Specific binding capacity | | Alkali bentonite with 0.018 meq TMT - Specific binding capacity | | Pro rata binding capacity with TMT | Increase of the heavy metal binding capacity | |
|---|---|---|---|---|---|---|---|
|  | mg/g | meq/g | mg/g | meq/g | mg | (a) with the complex % | (b) with TMT % |
| $Cd^{+2}$ | 87 | 0.86 | 97 | 0.97 | 1.01 | 11.5 | 2.0 |
| $Ni^{+2}$ | 64 | 2.18 | 77 | 2.62 | 0.52 | 20.3 | 0.8 |
| $Hg^{+2}$ | 50 | 0.5 | 60 | 0.6 | 1.80 | 20.0 | 3.6 |

EXAMPLE 4

In the same way as Example 1, water containing 10 mg/liter heavy metal was treated with 100 mg/liter kaolin, treated with 0.018 meq trimercapto-S-triazine (TMT). The pH value was 9. The kaolin was obtained from the Engelhard/Omya firm. The residue in a sieve of 1 μm was 27%. The results are presented in Table IV.

TABLE IV

|  | Kaolin specific binding capacity | | Kaolin with 0.018 meq TMT, specific binding capacity | | Pro rata binding capacity with TMT | Increase of the heavy metal binding capacity | |
|---|---|---|---|---|---|---|---|
|  | mg/g | meq/g | mg/g | meq/g | mg | (a) with the complex % | (b) with TMT % |
| $Cd^{+2}$ | 66 | 1.17 | 72 | 1.28 | 1.01 | 9.0 | 1.5 |
| $Ni^{+2}$ | 41 | 1.39 | 54 | 1.84 | 0.52 | 36.6 | 1.3 |
| $Hg^{+2}$ | 40 | 0.4 | 50 | 0.5 | 1.80 | 25 | 4.5 |

EXAMPLE 5

100 g of an active bentonite sorption complex, laden with 52 mg copper and containing 68% water, from example 1, (1664 mg copper, in reference to the dry substance), was mixed with 70 ml 38% $H_2SO_4$ and 70 ml distilled water, and held at boiling temperature, with stirring, for one hour.

After filtering and washing the filter cake with 500 ml $H_2O$, the copper in the filtrate was electrolytically precipitated. The amount recovered amounted to 1514 mg=91% of the theoretical amount.

I claim:

1. A composition, comprising a thiol-treated sorption complex, for the removal of heavy metal ions from dilute solutions, which comprises:
   A. a thiolate having two or more —SMe— groups, wherein Me represents an alkali or ammonium; and
   B. a swellable silicate whose ion exchange capacity is 5–350 meq/100 g.
2. A composition, as defined in claim 1, in which said thiolate is derived from a heterocyclic dithiol.
3. A composition, as defined in claim 1, in which said thiolate is derived from a heterocyclic trithiol.
4. A composition, as defined in claim 3, in which the thiol is derived from trimercaptotriazine.
5. A composition, as defined in claim 1, in which the weight ratio between silicate and thiolate is between 100:1 and 5000:1.
6. A composition, as defined in claim 5, in which the weight ratio between silicate and thiolate is between 100:1 and 1000:1.
7. A composition, as defined in claim 1, in which the sorption complex has a pH value in the range of about 9.5–12, as determined in an aqueous medium with 1 g of the sorption complex per 100 ml of $H_2O$.
8. A composition, as defined in claim 1, characterized in that the silicate represents a smectitic clay mineral.
9. A substance, as defined in claim 1, in which the silicate represents a kaolinite clay mineral.
10. A substance, as defined in claim 1, in which the silicate represents a zeolite.
11. A substance, as defined in claim 1, characterized in that the silicate represents a mixture of a bentonite, kaolinite, and a zeolite mineral.
12. A composition, as defined in claim 8, in which the smectitic clay is a member of the montmorillonite-beidellite series.
13. A composition, as defined in claim 8, in which the smectitic clay mineral is an alkali bentonite.

* * * * *